US007317553B2

(12) United States Patent
Otsuki

(10) Patent No.: US 7,317,553 B2
(45) Date of Patent: Jan. 8, 2008

(54) SETTINGS OF SUB-SCAN FEED ERROR AND SUB-SCAN FEED AMOUNT SUITABLE FOR PRINTING MEDIUM

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 741 days.

(21) Appl. No.: 09/961,254

(22) Filed: Sep. 25, 2001

(65) Prior Publication Data

US 2002/0044290 A1 Apr. 18, 2002

(30) Foreign Application Priority Data

Sep. 27, 2000 (JP) ............................ 2000-293192
Oct. 13, 2000 (JP) ............................ 2000-313210

(51) Int. Cl.
*G06F 15/00* (2006.01)

(52) U.S. Cl. ........................ 358/1.5; 358/1.12; 347/8; 347/9; 347/218; 271/266; 400/636

(58) Field of Classification Search ................. 101/11; 358/1.15, 1.5, 1.12; 347/41, 8, 9, 218; 271/266; 400/636
See application file for complete search history.

(56) References Cited

U.S. PATENT DOCUMENTS 2,714,845 A * 8/1955 Cogan ........................ 355/96
5,529,414 A * 6/1996 Katano et al. ........... 400/636.2
5,586,496 A * 12/1996 Shinohara et al. ....... 101/93.04
5,610,639 A * 3/1997 Takada et al. ................ 347/19
5,696,542 A * 12/1997 Matsubara et al. ........... 347/12
5,793,177 A * 8/1998 Chia .......................... 318/685
5,828,387 A * 10/1998 Wataya et al. ................ 347/14
5,838,465 A * 11/1998 Satou et al. ................ 358/520
5,852,452 A * 12/1998 Imai .............................. 347/8
5,988,790 A * 11/1999 Koike et al. .................. 347/41
6,126,345 A * 10/2000 Ito et al. ..................... 400/624
6,158,841 A * 12/2000 Kakutani ...................... 347/40
6,266,135 B1 * 7/2001 Hosoi et al. ................ 355/400

FOREIGN PATENT DOCUMENTS

JP 62-119075 5/1987
JP 7-276781 10/1995
JP 11-254776 9/1999
JP 2000-108431 4/2000

OTHER PUBLICATIONS

Computer translation of Japanese Patent Document No. 10-337863, Dec. 22, 1998, Sumiya et al.*

* cited by examiner

*Primary Examiner*—Twyler Lamb
*Assistant Examiner*—Mark R. Milia
(74) *Attorney, Agent, or Firm*—Oblon, Spivak, McClelland, Maier & Neustadt, P.C.

(57) ABSTRACT

A printing device comprises a feed mechanism configured to advance the printing medium intermittently. The feed mechanism is adjusted so that an average feed error δave is in the vicinity of zero with respect to a most slippery printing medium among plural types of printing media designed to be used in the printing device. Alternatively, a printing device comprises a controller to correct a feed amount such that an average feed error δave is in the vicinity of zero with respect to at least one specific printing medium among plural types of printing media designed to be used in the printing device.

28 Claims, 12 Drawing Sheets

IN CASE OF POSITIVE AVERAGE FEED ERROR δ ave.
(Light banding occurs between L2 and L3.)

IN CASE OF NEGATIVE AVERAGE FEED ERROR − δ ave.
(Dark banding occurs between L2 and L3.)

FEED ERROR(COMPARATIVE EXAMPLE)

ACCUMULATED FEED ERROR (COMPARATIVE EXAMPLE)

PRINT DATA FORMAT

CONTENTS OF PAPER FEED CORRECTION COMMAND CFC

| | PAPER FEED CORRECTION | PAPER FEED CORRECTION COMMAND CFC | FEED COMMAND TO DRIVER 62 |
|---|---|---|---|
| PLAIN PAPER | 0 | — | L·D |
| GLOSSY FILM | 0 | — | L·D |
| PHOTOGRAPHIC PAPER | $\delta 1$ (= 2Δ) | 2 | L·D+2Δ |
| ROLL TYPE PHOTOGRAPHIC PAPER | $\delta 2$ (= 3Δ) | 3 | L·D+3Δ |

SETTINGS OF SUB-SCAN FEED ERROR AND SUB-SCAN FEED AMOUNT SUITABLE FOR PRINTING MEDIUM

BACKGROUND OF THE INVENTION

1. Field of the Invention

The present invention relates to a printing technology for recording an image onto a printing medium.

2. Description of the Related Art

Ink jet printers and laser printers are widely used as computer output devices. Particularly, color printers are prevailing in recent years. Since color reproducibility of ink significantly depends on types of printing media, printer manufacturers provide various types of printing media suitable for color printing.

The type of printing medium has effect not only on the color reproducibility of ink, but also on precision of feeding printing medium (referred to as "paper feed" hereinafter). For example, paper feed operation for a printing medium with a slippery surface and the same operation for a printing medium with an unslippery surface may sometimes result inconsiderably different actual feed amounts.

Image quality is greatly affected by feed precision. However, the paper feed precision according to types of printing media has not been taken in consideration. Such problem has been seen not only in color printers but has been commonly seen in other printing devices.

SUMMARY OF THE INVENTION

Accordingly, an object of the present invention is to improve quality of printed image by considering paper feed precision according to a type of printing medium to be used in actual printing.

In order to attain at least part of the above and related objects of the present invention, there is provided a printing device for printing an image on a printing medium. The printing device comprises a feed mechanism configured to advance the printing medium intermittently. The feed mechanism is adjusted so that an average feed error δave is in the vicinity of zero with respect to a most slippery printing medium among plural types of printing media designed to be used in the printing device.

Since the average feed error δave regarding the most slippery printing medium is adjusted close to zero, it is possible to improve image quality even for a slippery printing medium.

According to another aspect of the present invention, a printing device comprises a feed mechanism configured to advance the printing medium intermittently; and a controller configured to supply a feed command to the feed mechanism to control the advance of the printing medium by the feed mechanism. The controller is configure to correct a feed amount such that an average feed error δave is in the vicinity of zero with respect to at least one specific printing medium among plural types of printing media designed to be used in the printing device. The controller then supplies the feed command representing the corrected feed amount to the feed mechanism.

Since the average feed error δave regarding a specific printing medium is adjusted close to zero, image quality can be improved for this type of printing medium.

These and other objects, features, aspects, and advantages of the present invention will become more apparent from the following detailed description of the preferred embodiments with the accompanying drawings.

DESCRIPTION OF THE PREFERRED EMBODIMENT

Modes of implementation of the present invention are described below based on embodiments in the following order.

A. General structure of the device:

B. Sub-scan feed precision and image quality degradation:

C. Setting of feed precision in the first embodiment:

D. Correction of feed amount in the second embodiment:

E. Modifications

Figure 1:
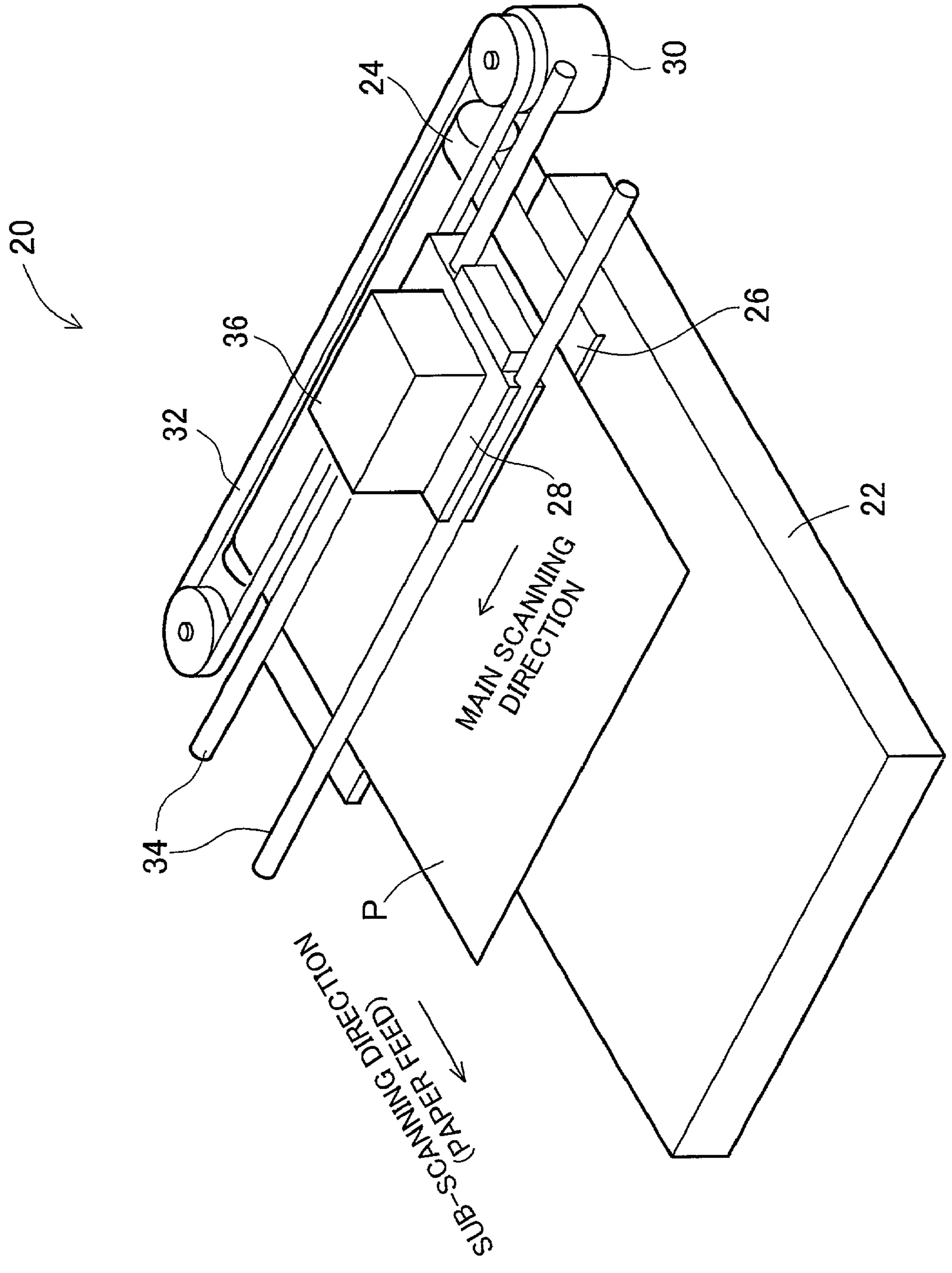
FIG. 1 is a general perspective view of a color ink jet printer 20 as an embodiment of the present invention.

A. General structure of the device:

FIG. 1 is a general perspective view showing the main structure of a color ink jet printer 20 used as an embodiment of the present invention. This printer 20 is equipped with a paper stacker 22, a paper feed roller 24 that is driven by a step motor not shown, a platen 26, a carriage 28, a carriage motor 30, a pulling belt 32 that is driven by the carriage motor 30, and a guide rail 34 for the carriage 28. A print head 36 equipped with numerous nozzles is mounted on this carriage 28.

The printing paper P is taken up onto a paper feed roller 24 from the paper stacker 22, and is transported in the sub-scan direction on the surface of the platen 26. The carriage 28 is pulled by the pulling belt 32 that is driven by the carriage motor 30, and is thus moved in the main scan direction along the guide rail 34. The main scan direction is perpendicular to the sub-scan direction.

Figure 2:
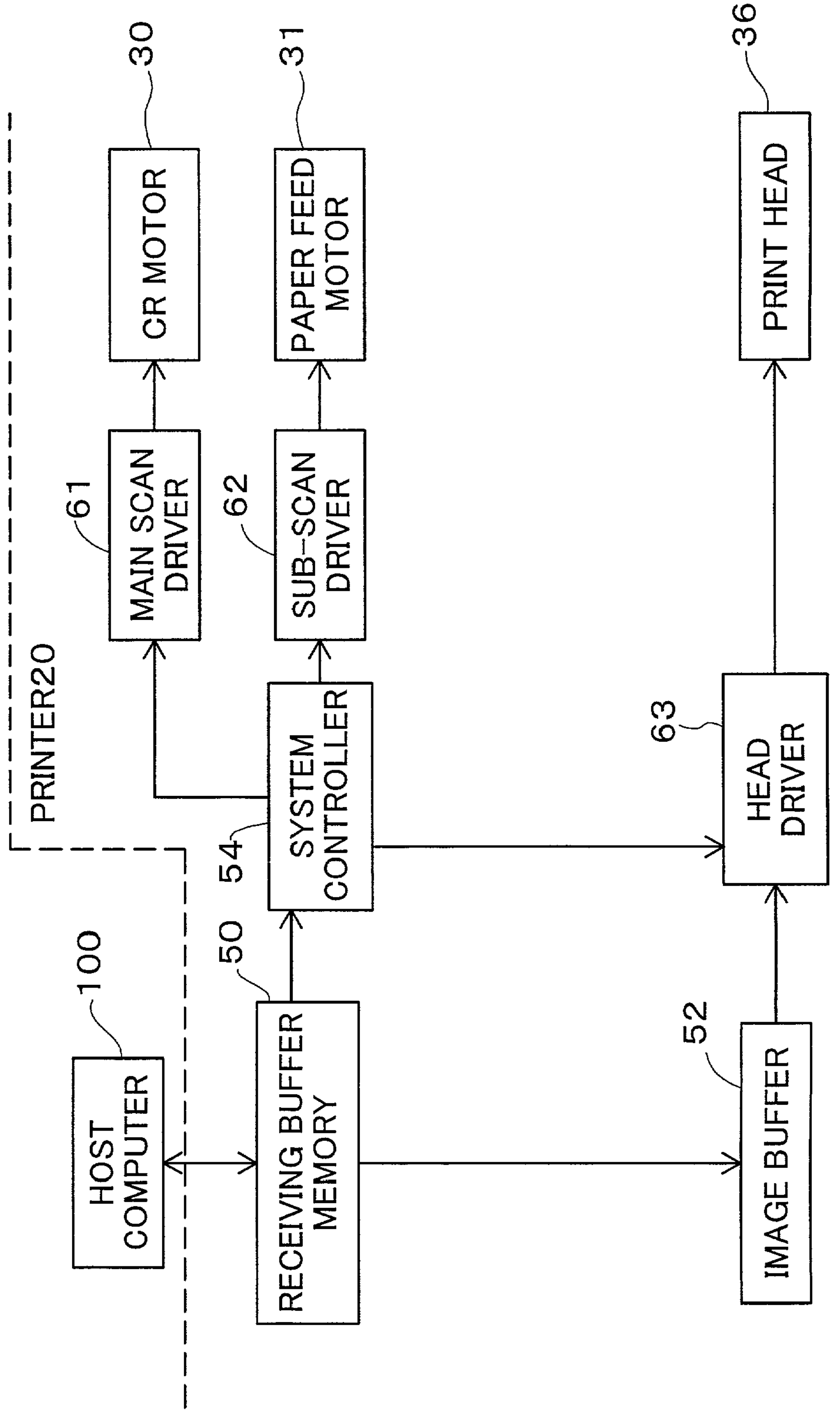
FIG. 2 is a block diagram showing the electrical configuration of the printer 20.

FIG. 2 is a block diagram showing the electrical configuration of the printer 20. The printer 20 is equipped with a receiving buffer memory 50 for receiving signals supplied from a host computer 100, an image buffer 52 that stores printing data, and a system controller 54 that controls operation of the entire printer 20. The system controller 54 is coupled to a main scan driver 61 that drives the carriage motor 30, a sub-scan driver 62 that drives the paper feed motor 31, and a head driver 63 that drives the print head 36.

The main scan driving mechanism is comprised of the main scan driver 61, the carriage motor 30, the pulling belt 32 (FIG. 1), and the guide rail 34. The sub-scan driving mechanism (also referred to as "feed mechanism") is comprised of the sub-scan driver 62, the paper feed motor 31, and the paper feed roller 24 (FIG. 1).

The printer driver (not shown) of the host computer 100 generates printing data for performing printing and transfers them to the printer 20. The printing data thus transferred are temporarily stored in the receiving buffer memory 50. The system controller 54 in the printer 20 reads the required information from the printing data in the receiving buffer memory 50, and then sends the control signals to the respective drivers 61, 62, and 63 based on this information.

The printing data received by the receiving buffer memory 50 is divided into a plurality of color components and image data of each color component is stored in the image buffer 52. The head driver 63 reads the image data for each color component from the image buffer 52 according to the control signals from the system controller 54, and then drives the nozzle array of each color situated on the print head 36 in accordance therewith.

Figure 3:
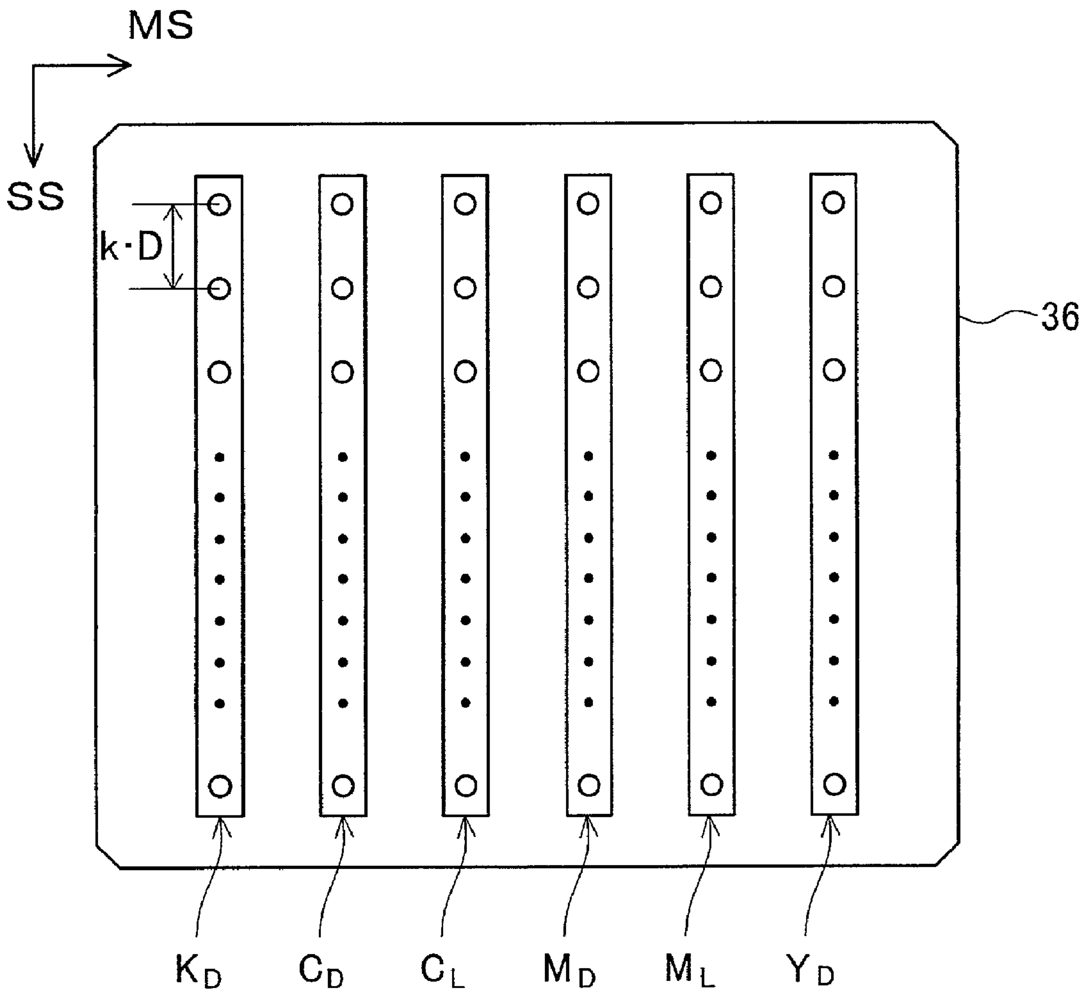
FIG. 3 is an explanatory diagram showing the nozzle array provided on the lower surface of the print head 36.

FIG. 3 is an explanatory diagram showing the nozzle array provided on the lower surface of the print head 36. There are provided, on the bottom surface of the print head 36, black ink nozzle group KD for discharging black ink, cyan ink nozzle CD for discharging cyan ink, light cyan ink nozzle group CL for discharging light cyan ink, magenta ink nozzle group MD for discharging magenta ink, light magenta ink nozzle group ML for discharging light magenta ink, and yellow ink nozzle group YD for discharging yellow ink.

The first large upper case letter in the designations of the nozzle groups designate the ink color, and the suffix "D" denotes ink with comparatively high density, whereas the suffix "L" denotes ink of comparatively low density.

The plurality of nozzles of each nozzle group are arranged along the sub-scan direction SS by a constant nozzle pitch k·D. In this case, D denotes the smallest dot pitch in the sub-scan direction (i.e, dot pitch for highest print resolution in the sub-scan direction), whereas k is an integer greater than or equal to 1. For example, dot pitch D is 1/720 inches (=35.3 μm) when the highest print resolution in the sub-scan direction is 720 dpi. As for the integer k, values such as 4 or 6 are used for example.

In each of the nozzles, piezo-electric elements (not shown) are provided as driving elements that drive each nozzle to cause discharge of ink droplets. During printing, ink droplets are discharged from each nozzle while the print head 36 is traveling along the main scanning direction MS along with the carriage 28 (FIG. 1).

Figure 4:
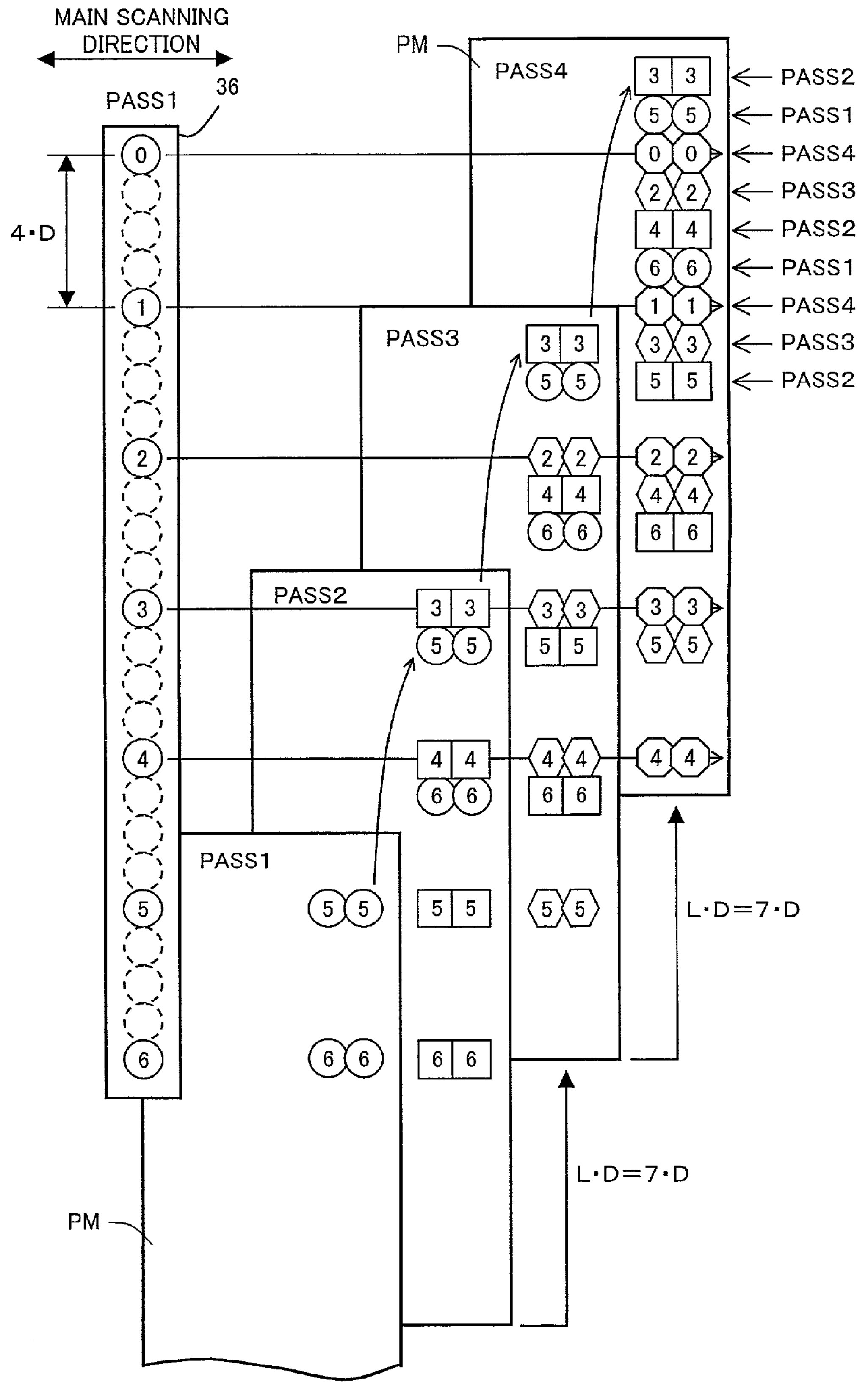
FIG. 4 is an explanatory diagram showing the sub-scanning and dot recording without feed errors.

B. Sub-scan feed precision and image quality degradation:

FIG. 4 is an explanatory diagram showing the sub-scanning and dot recording without feed errors. For ease of explanation, the print head 36 in this figure has only seven nozzles for one color component. The nozzle pitch k·D of this nozzle group in the sub-scan direction is quadruple of the dot pitch D. In the print head 36, the numerals 0-7 enclosed in circles denote the nozzle numbers.

Printing medium PM is advanced upward with a fixed sub-scan feed amount L·D (wherein L is an integer and D indicates a dot pitch) by the sub-scan driving mechanism every time one main scan completes. In the example of FIG. 4, L=7. Additionally, in this specification, a single main scan is also referred to as a "pass". In case of uniform sub-scan feed by a constant feed amount L·D, it is preferable to select the integer L such that a remainder of L divided by the integer k (a nozzle pitch) is equal to (k−1).

On the printing medium PM captioned "pass 1", there are shown numerals enclosed in circles representing the ordinal numbers of the nozzles that record dot positions (also referred to as "pixel positions") on raster lines (also referred to as "main scanning lines") subject to recording in the first pass. That is, in the pass 1, the print head 36 discharges ink from the fifth and the sixth nozzles respectively while moving in the main scanning direction, and records the dots on the dot positions of the two raster lines. Ordinal numbers of nozzles that perform dot recording are enclosed by squares for pass 2, by hexagons for pass 3, and by octagons for pass 4, respectively. The pass 2 records a raster line immediately above the raster line recorded in the pass 1. The pass 3 records a raster line immediately above the raster line recorded in the pass 2. As such, in most of the passes, a raster line immediately above the raster line recorded in the most recent pass is recorded.

In the recording method shown in FIG. 4, the printing medium PM shifts seven dots upwards for every single sub-scan feed, and each of the nozzles performs the dot recording for all of the dot positions on each of the raster lines in a single main scan. The terms "pass 1" to "pass 4" indicated on the right hand side of the printing medium PM at the pass 4 represent in which pass each of the dot positions are recorded before the pass 4 is serviced.

Figure 5:
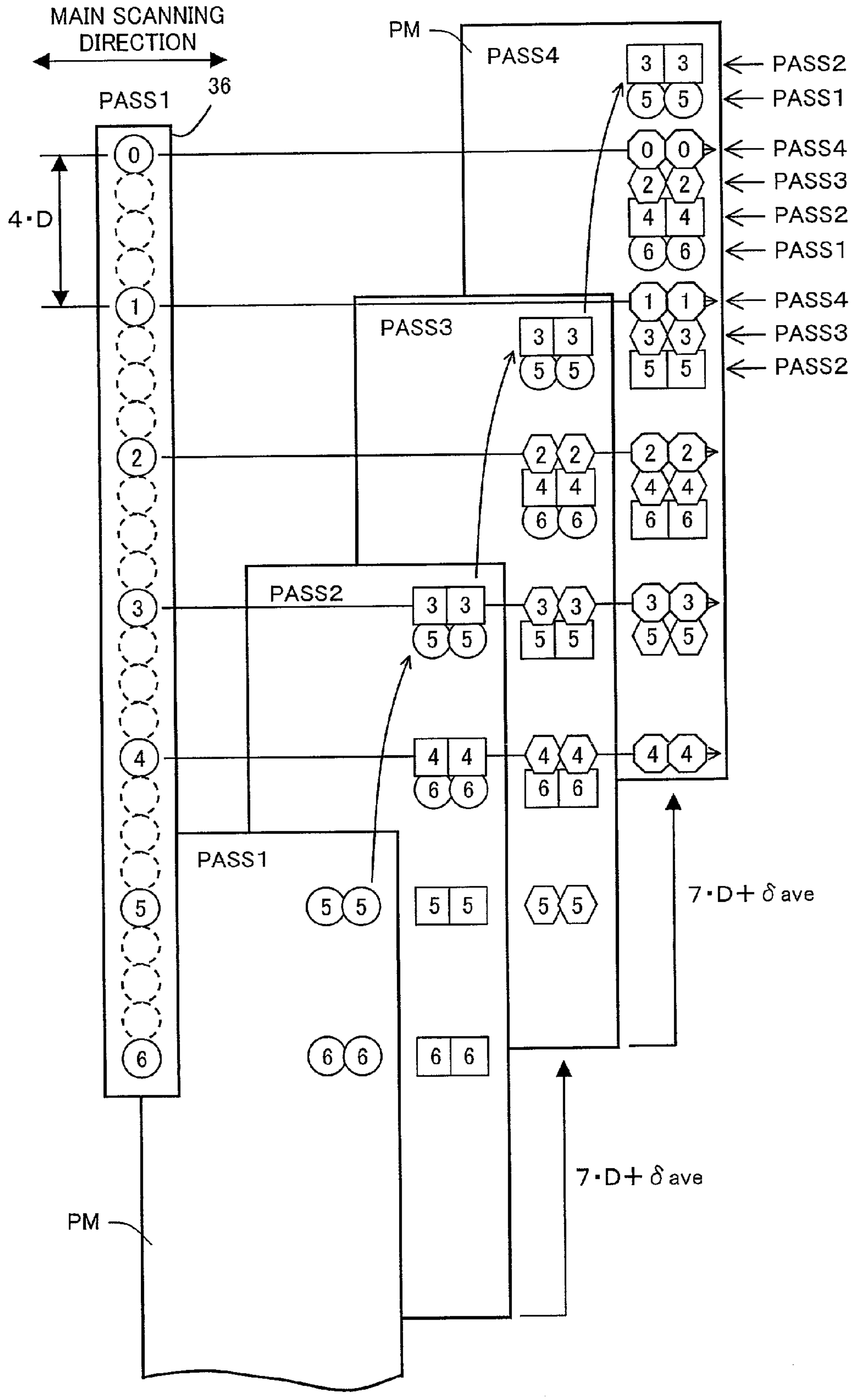
FIG. 5 is an explanatory diagram showing the sub-scanning and dot recording with feed errors.

FIG. 5 is an explanatory diagram showing the sub-scanning and the dot recording with feed errors. It is assumed herein that the feed amount L for a single sub-scan feed has a fixed amount of positive feed error δave. That is, in the pass 2 of the FIG. 5, the printing medium PM is overfed upward by the error δave when compared with the ideal case shown in FIG. 4. The dot positions (indicated by numerals enclosed in squares) on the raster lines to be recorded in the pass 2 are accordingly shifted upward relative to the case shown in FIG. 4. As a result, the raster lines recorded in the pass 1 and the raster lines recorded in the pass 2 are somewhat overlapped. As for the pass 3 and the pass 4, the printing medium PM is overfed upward by the error δave as well, so that the dot positions on the raster lines to be recorded are shifted upward by δave respectively.

However, in actual cases, the feed error generally varies for every sub-scan feed. The feed error δave shown in FIG. 5 thus can be considered as an average of various feed errors. In other words, FIG. 5 illustrates a virtual case wherein every single sub-scan feed has an error equals to the average feed error δave.

Figure 6A:
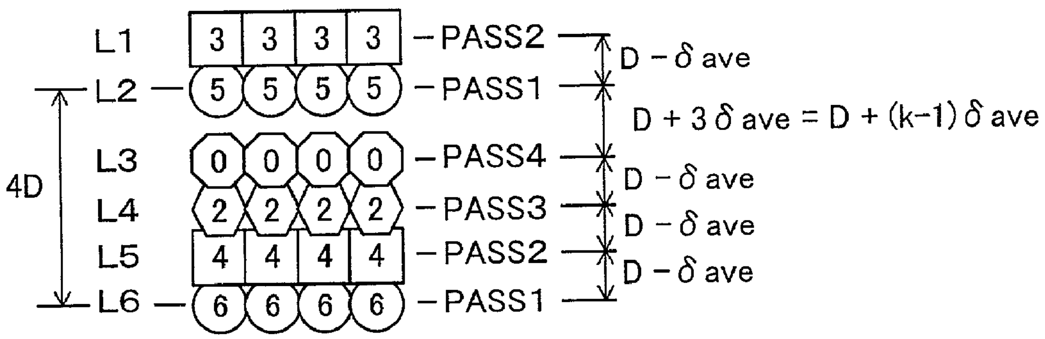
FIGS. 6A and 6B are explanatory diagrams showing the deviation of raster lines when the feed error δave is positive and negative, respectively.

FIG. 6A illustrates positional relationship between the raster lines to be recorded in every pass of FIG. 5. The raster line L5 recorded by the fourth nozzle in the pass 2 is separated from the raster line L6 recorded by the sixth nozzle in the pass 1 by (D−δave). That is, the pitch between these raster lines L5 and L6 is shorter than an ideal dot pitch D (i.e, ideal pitch of raster lines) by the feed error δave. Similar deviation would occur between the pass 2 and the pass 3 and between the pass 3 and the pass 4. As a result, the pitch between the raster line L3 recorded by the zero nozzle in the pass 4 and the raster line L2 recorded by the fifth nozzle in the pass 1 becomes (D+3δave), which is larger than the dot pitch D by 3δave. In other words, feed error of −3δave corresponding to three feeds is accumulated between the raster line L2 recorded in the pass 1 and the raster line L3 recorded in the pass 4.

Figure 6B:
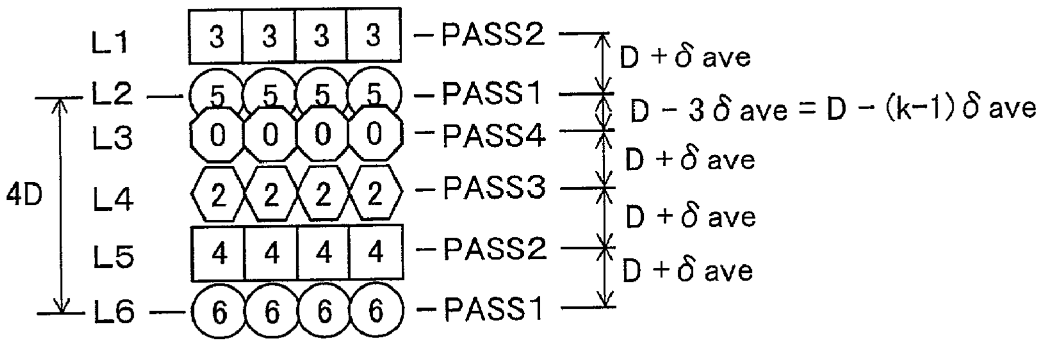

FIG. 6B illustrates a case where the feed error is a negative value of −δave. In this case, similar to FIG. 6A, a feed error of −δave for three feeds is accumulated in the distance between the raster lines L2 and L3, but its positive/negative sign is opposite to the case shown in FIG. 6A. That is, the pitch between these two raster lines L2 and L3 are smaller than the dot pitch D by 3δave.

As can be understood from FIGS. 6A and 6B, in case of interlace printing with a constant sub-scan feed amount (referred to as "constant feeding"), the maximum value of the accumulated feed error between adjacent raster lines would become (k−1)·δave in most cases, where k is an integer indicating a nozzle pitch. The term "interlace printing" denotes a printing method wherein the integer k is greater than or equal to 2, and a single pass of main scan leaves some raster line unrecorded between raster lines recorded in the pass.

In case of FIG. 6A, since the pitch between the raster lines L2 and L3 is greater than an ideal pitch D, these raster lines L2 and L3 can be seen as stripes of low density, with the naked eye. These low density stripes (also referred to as "light banding" hereafter) are observed as image quality degradation.

On the other hand, in case of FIG. 6B, since the distance between the raster lines L2 and L3 is smaller than the ideal pitch D, these raster lines L2 and L3 can be seen as stripes of high density with the naked eye. These high density stripes (also referred to as "dark banding" hereafter) are also observed as image quality degradation.

In this way, the existence of error δave in the sub-scan feed amount causes the light banding or the dark banding. Accordingly, it is preferable that the sub-scan feed mechanism is adjusted to have its average feed error δave in the vicinity of zero. The term "average feed error δave in the vicinity of zero" indicates an value in a range of about −0.6D to about +0.6D, where D is a dot pitch corresponding to the highest print resolution in the sub-scanning direction. The average error δave is preferably within a range of about −0.5D to about +0.5D. As can be understood from FIG. 6A and FIG. 6B, in case of interlace printing, adjacent raster lines may sometimes be departed by (k−1)·δave. Accordingly, the deviation of (k−1)·δave is particularly preferable to be within a range of about −0.5D to about +0.5D. For example, when the highest resolution in the sub-scan direction is 720 dpi, the average feed error δave may be in a range of about −21 μm to about +21 μm, preferably in a range of about −18 μm to about +18 μm, and when k=4, it is especially preferable to be in a range of about −6 μm to about +6 μm. As long as the average feed error δave is within such ranges, it is possible to prevent image quality degradation caused by the banding resulted from the feed error.

By the way, in color printing, light banding is more noticeable than dark banding. This is because in color printing a plurality of ink dots with various colors are recorded, so that even if light bandings are present in a printed color image, their influence can be moderated by other ink dots. Accordingly, a positive value is more preferable than a negative value for the feed error δave.

However, the value of the average feed error δave depends on types of printing media. In other words, some printing media are comparatively slippery and others are comparatively unslippery. The average feed error δave tends to be negative for slippery printing media and positive for unslippery printing media. Additionally, a plurality types of printing media are generally available for the printer 20. It is therefore possible to appropriately set the feed error δave for comparatively slippery and comparatively unslippery printing media respectively, as discussed below, thereby improving the image quality.

Figure 7:
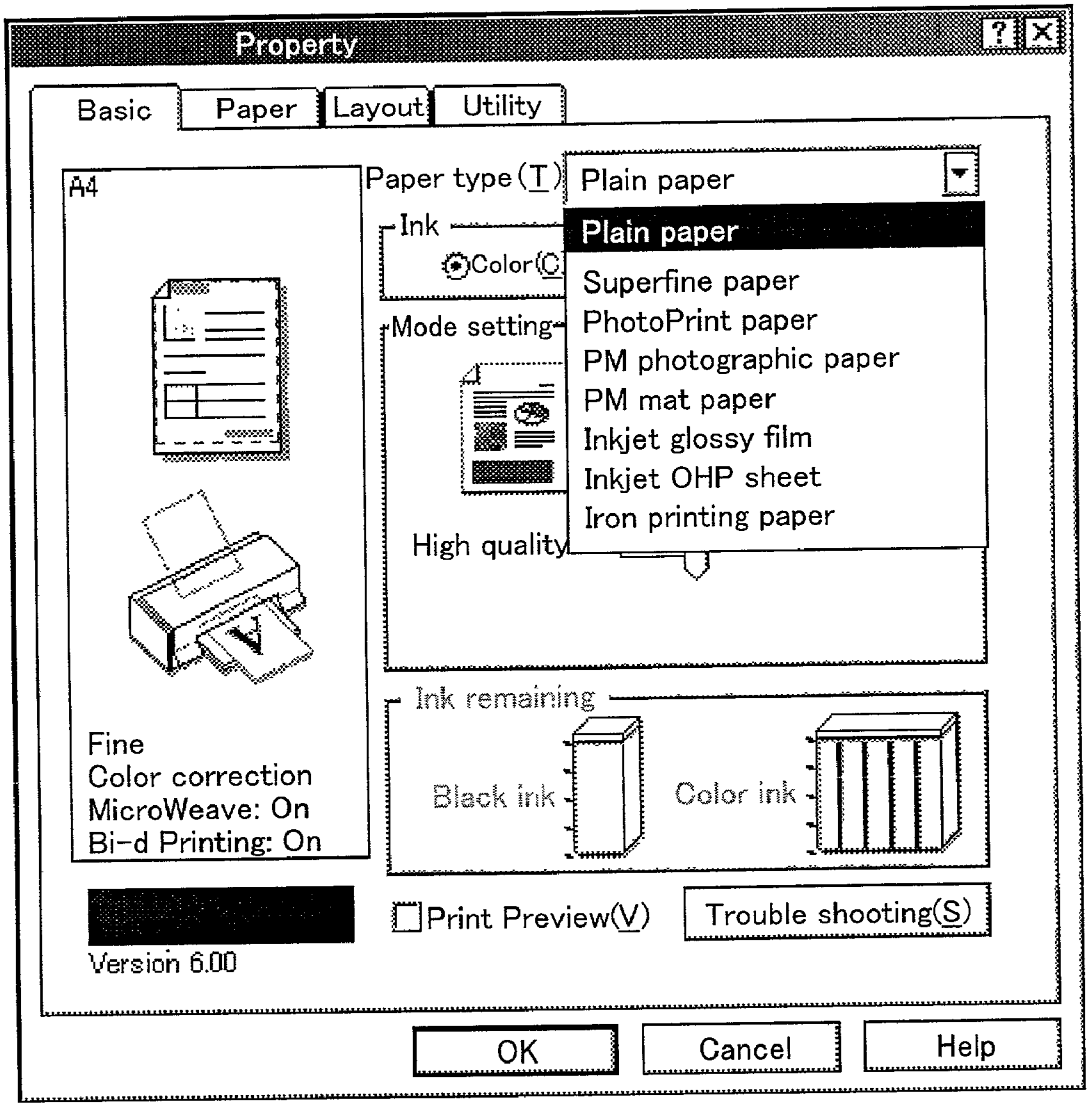
FIG. 7 is an explanatory diagram showing an user interface of a printer driver.

C. Setting of feed precision in the first embodiment:

FIG. 7 is an explanatory diagram showing an user interface of a printer driver displayed on a screen of the host computer 100 (FIG. 2). User can select one printing medium to be actually used from plural types of printing media (also referred to as "printing paper") designed to be used in this printer 20. The term "plural types of printing media designed to be used in this printer 20" indicates commercially available printing media dedicated for this printer 20.

Figure 8A:
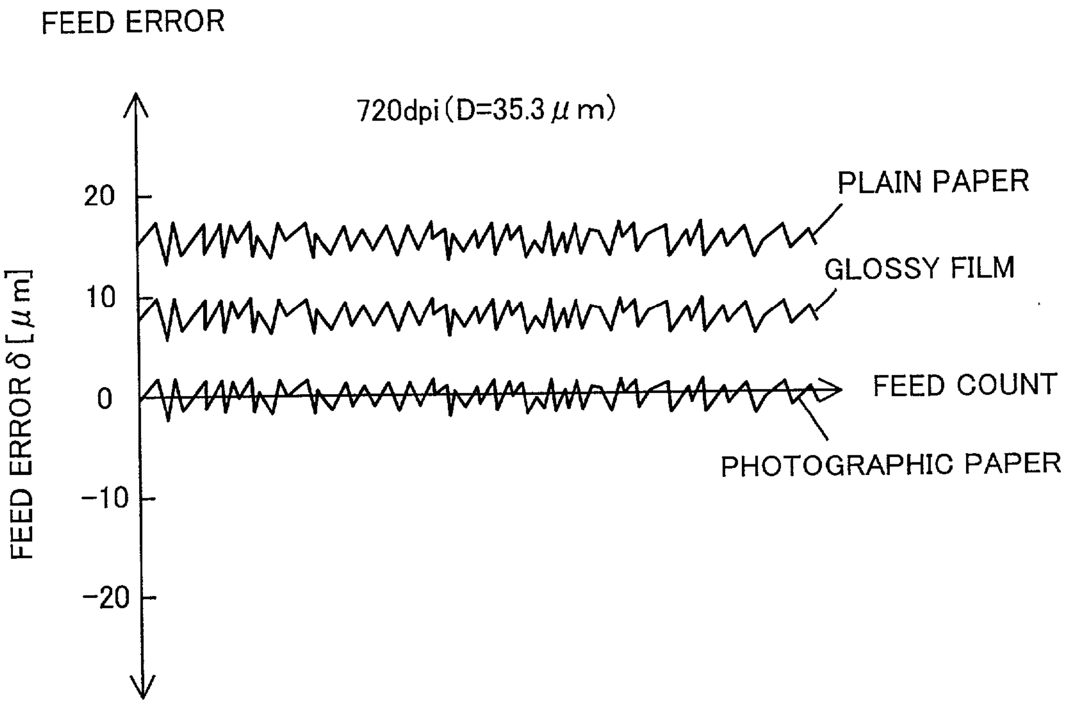
FIGS. 8A and 8B show the first example of feed error δ and accumulated feed error Σδwith respect to the respective printing media in the first embodiment.
Figure 8B:
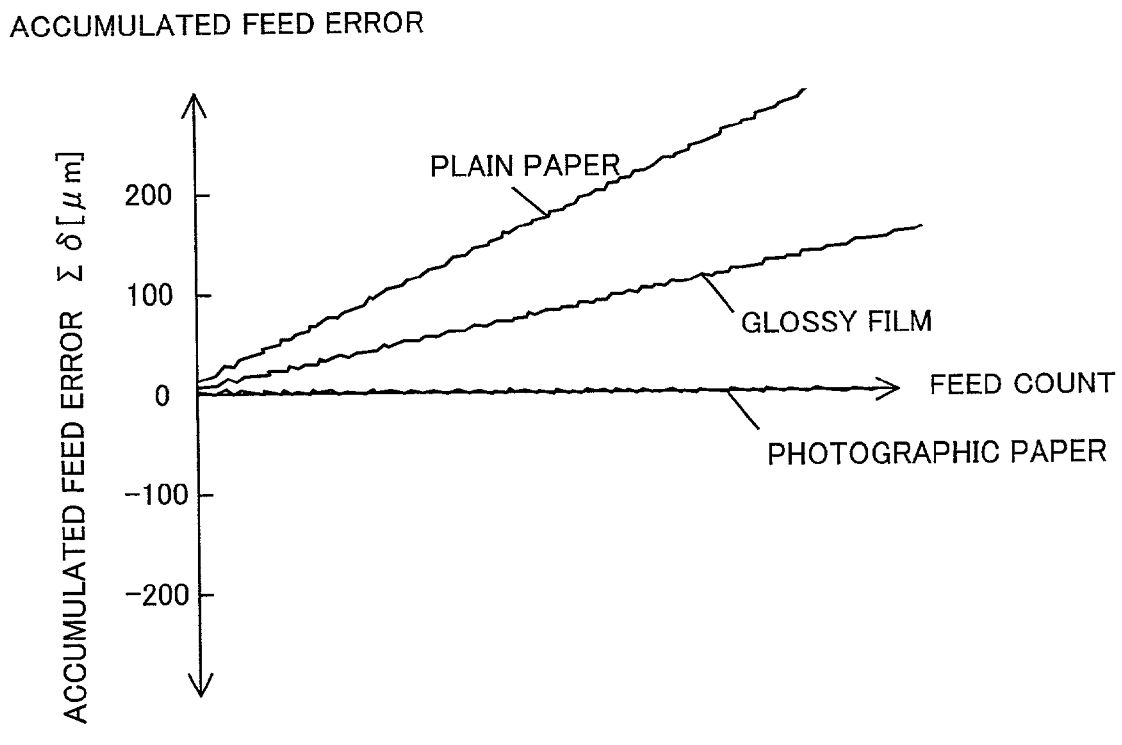

FIGS. 8A and 8B are explanatory diagrams showing first example of setting feed errors δ with respect to three types of printing media. FIG. 8A illustrates variance of feed errors δ with respect to three types of printing media, i.e, plain paper, glossy film, and photographic paper. The feed error varies for every sub-scan, but its average is approximately constant. In other words, the average feed error δave is about 15 μm for plain paper, about 8 μm for glossy film, and about 0 μm for photographic paper.

Unslippery printing medium would be fed with almost no slipping by the sub-scan driving mechanism. On the contrary, slippery printing medium would be fed with slipping, so that its feed amount would be smaller than that of unslippery printing medium. That is, the term the printing medium is "more slippery" indicates that the value of its feed error δ is smaller. Among the three types of printing media shown in FIGS. 8A and 8B, plain paper is most unslippery and photographic paper is most slippery. The photographic paper is the most slippery printing medium among the plural types of printing media shown in FIG. 7. FIG. 8B shows accumulated feed errors Σδ with respect to the three printing media.

In this specification, the term "feed error δ" indicates difference between a feed amount instruction given to the sub-scan driving mechanism in the printer 20 and an actual feed amount. For example, the value of the feed error δ in FIG. 8A indicates that the actual feed amount is 7D+δ when the system controller 54 (FIG. 2) has instructed the sub-scan driver 62 to perform the feeding by 7 dots.

The feed error δ is measured when the sub-scan feeding is performed repeatedly by a constant feed amount, for example. In general, the sub-scan feed amount is N×(k·D) or smaller, where N is the number of nozzles for one color ink arranged along the sub-scan direction, and k·D is a nozzle pitch. This is because if the sub-scan is performed by a feed amount greater than N×(k·D), there would be raster lines remained unrecorded. In measuring the feed error δ and its average δave, it is preferable to perform the sub-scan feed designed to be performed in actual printing by the printer 20.

In the example shown in FIG. 8A, the sub-scan feed mechanism is adjusted so that among the plural types of printing media designed to be used in the printer 20, average feed error δave of the most slippery photographic paper becomes approximately 0. Moreover, since the average feed error δave of the other printing media is positive, light banding may be occurred in the other printing media as explained with FIG. 6. However, light banding is not so noticeable as dark banding, and it has less impact on image quality. The setting as shown in FIG. 8A is accordingly preferable from the viewpoint of preventing the occurrence of dark banding.

In the example shown in FIGS. 8A and 8B, highest resolution in the sub-scan direction is 720 dpi and its corresponding dot pitch D is 35.3 μm. The average feed error δave of plain paper, about 15 μm, is accordingly about 0.42 times as much as this dot pitch D. As discussed previously, in this specification, the average feed error δave is referred to as "in the vicinity of zero" when it is within the range of about −0.6D to about +0.6D. Accordingly, the average feed error δave is in the vicinity of zero with respect to all three types of printing media in the example shown in FIG. 8A.

Figure 9A:
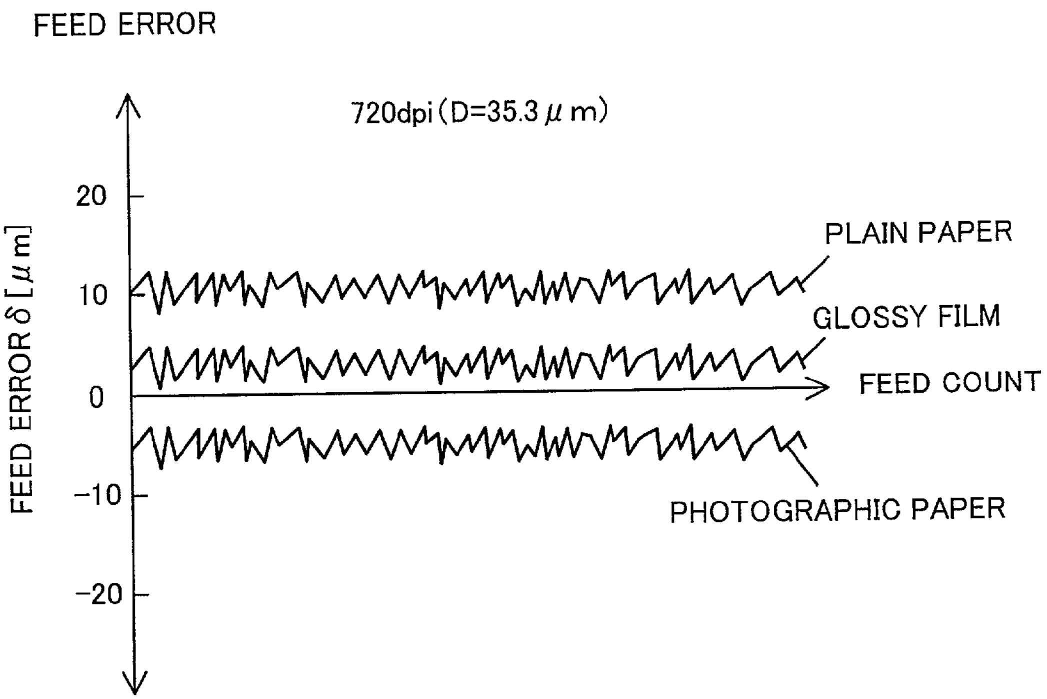
FIGS. 9A and 9B show the second example of feed error δ and accumulated feed error Σδwith respect to the respective printing medium in the first embodiment.
Figure 9B:
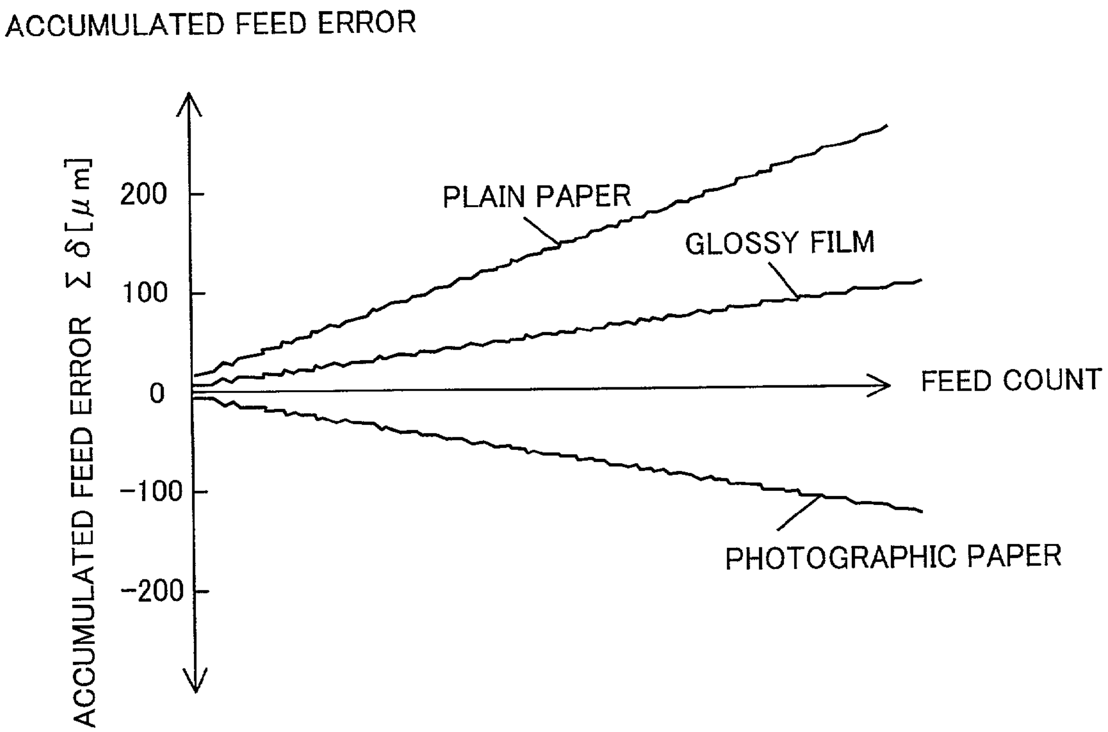

FIGS. 9A and 9B are explanatory diagrams illustrating a second example of setting feed error δ with respect to three types of printing media. In this example, the average feed error δave is about 10 μm for plain paper, about 3 μm for glossy film, and about −5 μm for photographic paper. In this example, the average feed error δave is still in the vicinity of zero for all types of printing media.

In the example of FIGS. 9A and 9B, dark banding may be occurred on photographic paper, and light banding may be occurred on glossy film. Since the average feed error δave regarding photographic paper is extremely close to zero, the degree of the dark banding is also comparatively low. On the other hand, the feed error regarding plain paper is smaller than that of FIG. 8A, so that the light banding caused by the feed error δ is reduced than that of the example shown in FIG. 8A. In the example shown in FIG. 9A, the sub-scan feed mechanism is adjusted so that the average feed error δave regarding each type of printing medium is more closer to zero than the example shown in FIG. 8A. Accordingly, the first embodiment has an advantage that no excessive banding would occur regardless of the type of printing medium used in actual printing.

Figure 10A:
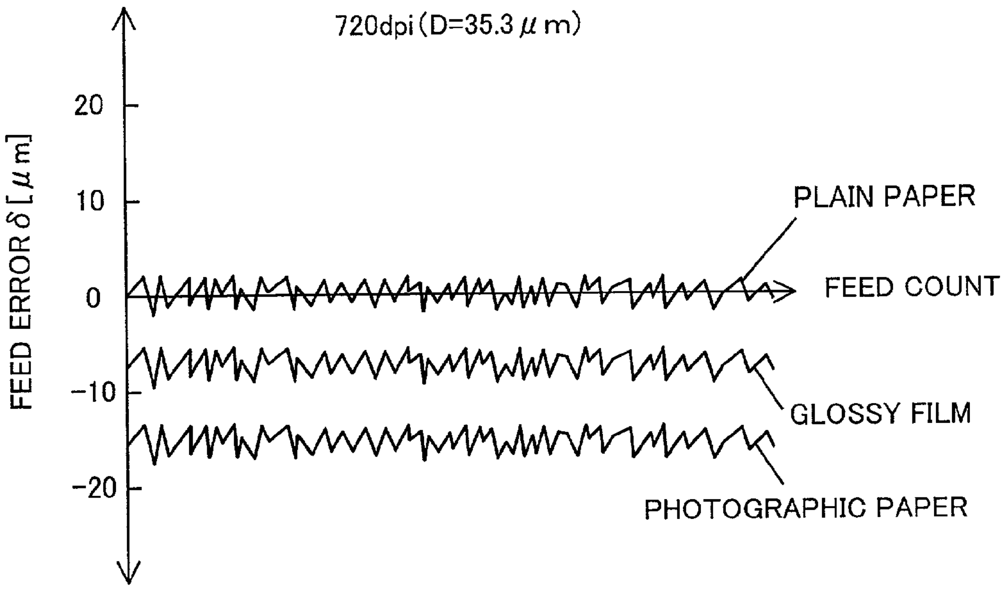
FIGS. 10A and 10B show feed error δ and accumulated feed error Σδ in a comparative example.
Figure 10B:
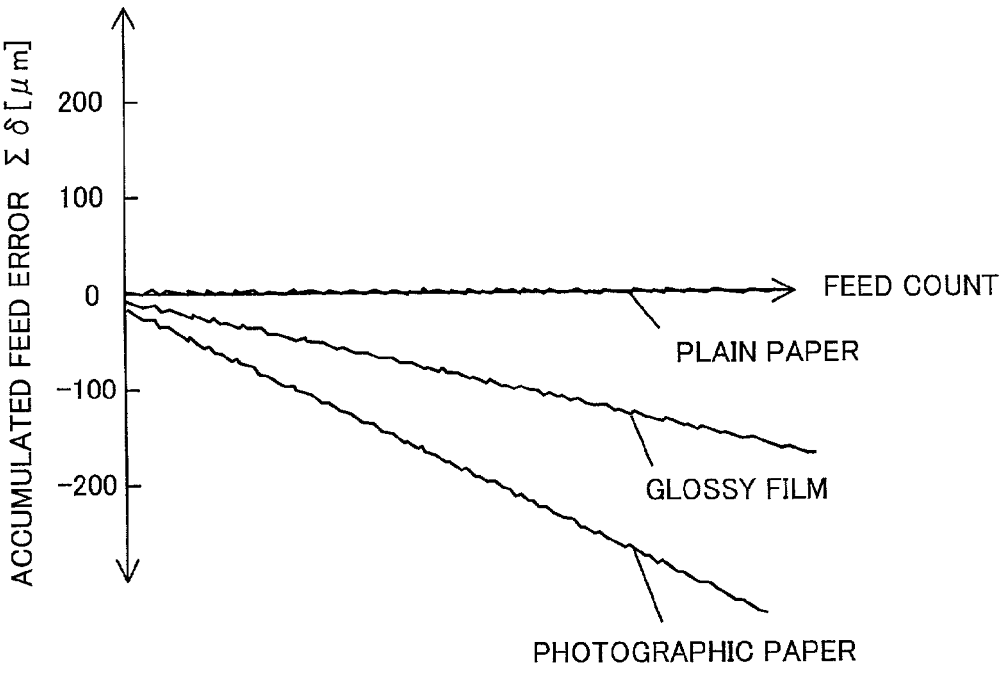

D. Feed amount correction in the second embodiment:

FIGS. 10A and 10B are explanatory diagrams showing feed error δ with respect to three types of printing media used in a comparative example. FIG. 10A illustrates variation of feed errorδ with respect to plain paper, glossy film, and photographic paper. The average feed error δave is about0 μm for plain paper, about −8 μm for glossy film, and about −15 μm for photographic paper. FIG. 10B shows accumulated feed errors Σδ with respect to these printing media.

In the example shown in FIG. 10A, the sub-scan feed mechanism is adjusted so that among the plural types of printing media designed to be used in the printer 20, average feed error δave of the most unslippery plain paper becomes approximately 0. Moreover, average feed error δave of the other printing media is negative. As for photographic paper, its average feed error δave is a considerably large negative value, which may cause dark banding and degradation of image quality.

Figure 11A:
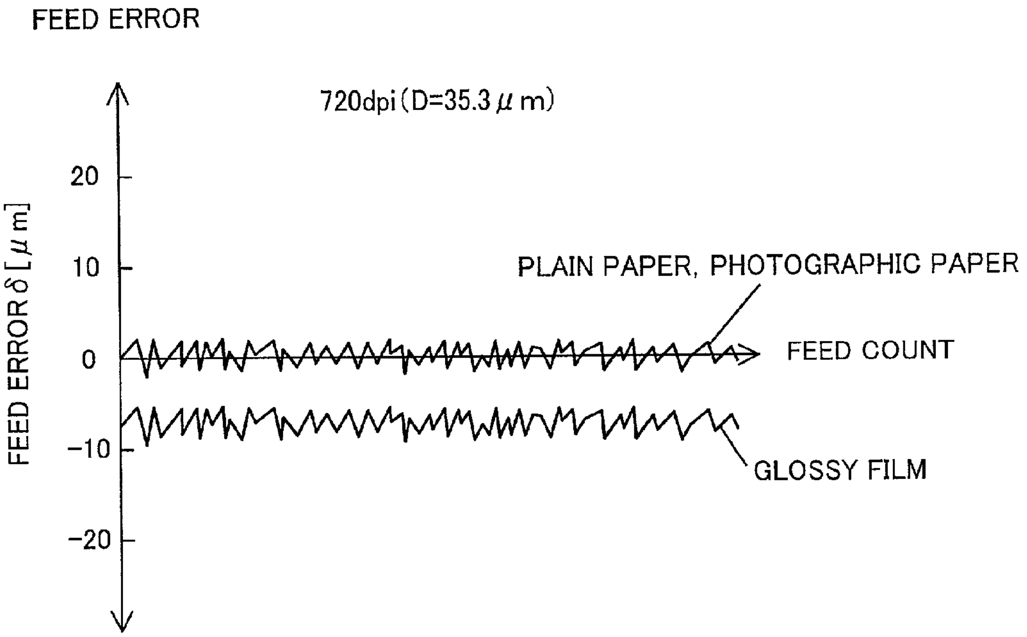
FIGS. 11A and 11B show feed error δ and accumulated feed error Σδ in the second embodiment.
Figure 11B:
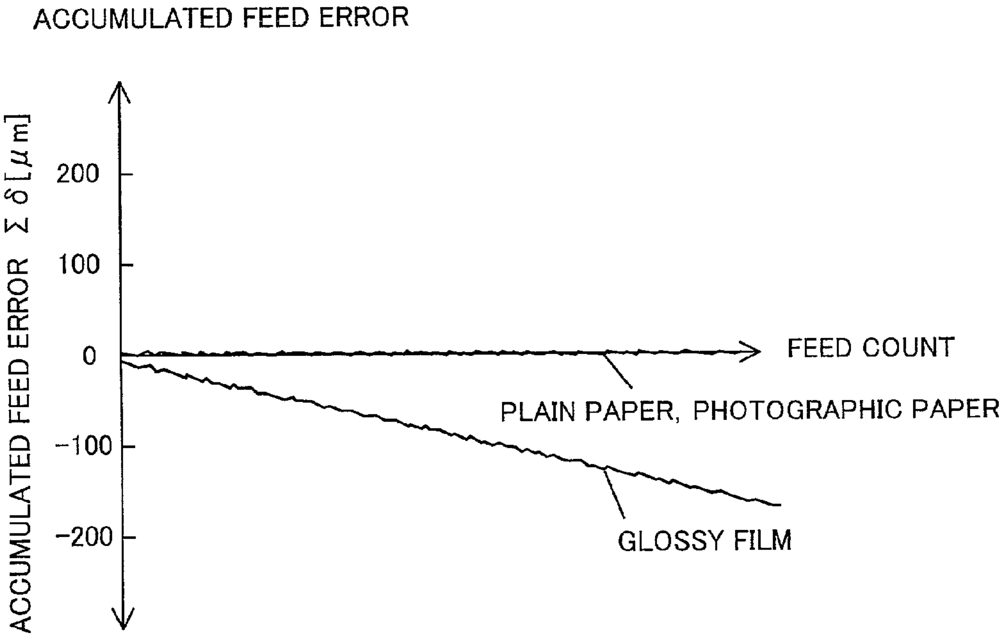

FIGS. 11A and 11B are explanatory diagrams showing feed error δ with respect to three types of printing media used in the second embodiment. As discussed later, actual feed amount of photographic paper is corrected by correcting feed amount command values supplied to the sub-scan driver 62 from the system controller 54 (FIG. 2) in the second embodiment, so that average feed error δave of photographic paper becomes about0 μm, which is substantially the same as that of plain paper. As result, image quality obtained with photographic paper can be improved, while maintaining image quality with plain paper.

Figures 12A, 12B:
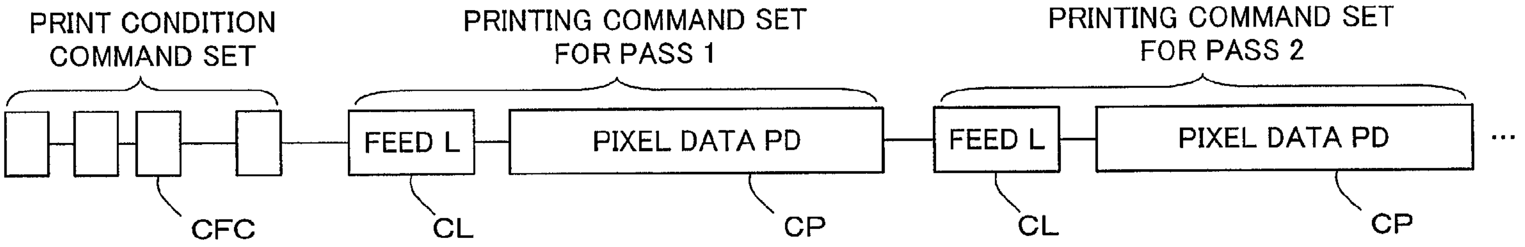
FIG. 12A shows print data format.
FIG. 12B shows contents of paper feed correction command.

FIGS. 12A and 12B are explanatory diagrams showing a method of correcting feed amounts used in the second embodiment. FIG. 12A illustrates a format of printing data supplied to the printer 20 from the host computer 100. The printing data contains a print condition command set and a printing command set for each pass. The print condition command set contains a paper feed correction command CFC that indicates a correction amount of sub-scan feed, as well as other commands that indicate printing resolution or printing direction (unidirectional/bi-directional). The printing command set for each pass contains a feed amount command CL and a pixel data command CP. The feed amount command CL indicates a normal sub-scan feed amount L·D (FIG. 5) performed immediately before each pass. Moreover, the pixel data command CP contains pixel data PD that represents recording status of every pixel to be recorded in each pass.

By the way, each of the various commands shown in FIG. 12A has a header portion and a data portion respectively, but is depicted in a simplified way in FIG. 12A. Moreover, these command sets are supplied from the host computer 100 to the printer 20 intermittently command by command. However, the printing data supplied from the host computer 100 to the printer 20 can also be in other formats other than the one shown in FIG. 12A.

FIG. 12B shows paper feed correction amounts regarding four types of printing media, values of the paper feed correction command CFC, and feed command values supplied to the sub-scan driver 62. In FIG. 12B, roll-type photographic paper is included in addition to the three types of printing media shown in FIGS. 11A and 11B.

Since the feed errors δ for plain paper and glossy film are comparatively small even without the feed amount correction, as shown in FIG. 10A, its paper feed correction amount is set to zero in the example of FIG. 12B. Additionally, the paper feed correction amount δ1 for photographic paper is set to be twice as large as the smallest paper feed correction amount Δ, wherein the term "the smallest paper feed correction amount Δ" is the smallest available correction amount determined in consideration of the configuration and functions of the paper feed motor 31 and such. The paper feed correction amount δ2 for roll-type photographic paper is set to be three times as large as the smallest paper feed correction amount Δ.

The roll-type photographic paper is a type of photographic paper wound up into a roll. The printing media wound up into a roll tends to bend or warp backward, and its feed error δave accordingly tends to be more negative. Accordingly, the paper feed correction amount δ2 is set to a large value. As for material of the roll-type printing medium (referred to "roll paper" hereinafter), materials other than photographic paper are also available. In this case, the paper feed correction amount is set according to material of the roll paper. The value of the paper feed correction amount is experimentally determined in advance for every printing medium.

The value of the paper feed correction command CFC supplied from the host computer 100 to the printer 20 is determined according to this paper feed correction amount. More concretely, the paper feed correction command CFC is set to a value proportional to the paper feed correction amount. That is, the paper feed correction command CFC regarding the sheet-type photographic paper is set to 2, and the paper feed correction command CFC regarding the roll-type photographic paper is set to 3. In case of plain paper or glossy film, no paper feed correction is performed, therefore no paper feed correction command CFC is supplied to the printer 20.

The value of the paper feed correction command CFC is determined by a command generator (not shown) in the printer driver according to selection of printing medium type in the window shown in FIG. 7. In the printer driver, relationship between each type of printing medium and its corresponding paper feed correction command CFC is registered in advance.

Based on this paper feed correction command CFC and the feed amount command CL (indicating normal feed amount L·D), the system controller 54 in the printer 20 supplies a feed command value to the sub-scan driver 62. This feed command value is indicated in the right-end column of FIG. 12B. In other words, in case of printing onto plain paper or glossy film, the system controller 54 supplies the sub-scan driver 62 with the normal feed amount L·D represented by the feed amount command CL directly as a feed command. On the other hand, in case of printing onto photographic paper or roll-type photographic paper, a value obtained by adding the paper feed correction amount δ1 or δ2 to the normal feed amount L·D is supplied to the sub-scan driver 62 as a feed command value.

As described above, when printing onto slippery printing medium such as photographic paper, the feed amount is corrected in the printer 20 to make the average feed error δave to be in the vicinity of zero and then a command of the corrected feed amount is given to the sub-scan driver 62, so that the banding due to feed error can be prevented and image quality can be improved. As for unslippery printing medium such as plain paper, the feed amount may not be corrected, and there would be an advantage that image quality on these printing media is not degraded while image quality on slippery printing media can be improved.

Additionally, in the second embodiment, the printer driver in the host computer 100 supplies the previously registered paper feed correction command CFC (FIGS. 12A and 12B) to the printer 20 according to the type of printing medium selected by the user. It is accordingly possible to improve image quality without imposing excessive burden on the printer driver.

E1. Modification 1

In the above embodiments, printers that perform “constant feeding” where a constant value is used as sub-scan feed amount is described, but the present invention can also be adopted to printers that perform “variable feeding” where a plurality of different values are used as sub-scan feed amount.

E2. Modification 2

Although color ink jet printer is described in the above embodiments, the present invention can also be adopted to black and white printers, and further to printers other than ink jet printers. The present invention can generally be used with printing devices in which printing of image onto a printing medium is carried out, such as facsimile machines and copy machines.

E3. Modification 3

In the embodiments described above, the integer k that indicates nozzle pitch is set to be 4, but this integer k can be any integer of 1 or greater. However, if k is equal to 1 and the nozzle pitch is equal to the dot pitch D, the problem of feed error accumulation as described with FIG. 6 would not be occurred. The present invention accordingly can obtain particularly significant effects when the integer k is 2 or greater.

E4. Modification 4

In the second embodiment, since the feed error δ is comparatively large with respect to the most slippery printing medium (photographic paper or roll-type photographic paper) among the plurality types of printing media available in the printer 20, paper feed correction has been performed against these printing media. However, adjustment of the feeding mechanism sometimes result in feed error δ of the most unslippery printing medium (such as plain paper) to be a large positive value and feed error δ of the most slippery printing medium to be approximately zero, as in the example of FIGS. 8A and 9A. In such cases, paper feed correction may be performed only against plain paper, which is the most unslippery printing medium, for example. That is, in the present invention, paper feed correction generally may be performed against at least one particular type of printing medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing device for printing an image on a printing medium, comprising:

a feed mechanism comprising a traction roller which advances a printing medium by gripping the printing medium, wherein the feed mechanism is configured to advance and stop the printing medium, wherein the feed mechanism is adjusted in an identical state for all of plural printing medium types of printing media designed to be used in the printing device so that an average feed error δave is in the vicinity of zero with respect to a printing medium having the smallest value for the average feed error among plural types of printing media designed to be used in the printing device.

2. A printing device according to claim 1, further comprising:

a print head configured to discharge ink to form dots on the printing medium, wherein the print head has N nozzles arranged in a feed direction of the printing medium by a pitch k·D for discharging ink of same color, where k is an integer of 1 or greater, D is a smalles dot pitch in the feed direction, and N is an integer of 2 or greater, and wherein the average feed error δave regarding the most slippery printing medium is an average error when the feeding has been performed by a feed amount of N×(k·D) or smaller.

3. A printing device according to claim 2, wherein the average feed error δave regarding the most slippery printing medium is within a range of about −0.5D to about +0.5D.

4. A printing device according to claim 3, wherein the average feed error δave is within a range of about −0.5D to about +0.5D with respect to all of the plural types of the printing media designed to be used in the printing device.

5. A printing device according to claim 3, wherein the integer k is 2 or greater, and wherein a value of (k−1)·δave obtained by multiplying the average feed error δave regarding the most slippery printing medium by (k−1) is within a range of about −0.5D to about +0.5D.

6. A printing device according to claim 2, wherein the average feed error δave is of positive value with respect to printing medium other than the most slippery printing medium among the plural types of printing media designed to be used in the printing device.

7. A printing device according to claim 6, wherein the average feed error δave regarding the most slippery printing media is of negative value.

8. A printing device for printing an image on a printing medium, comprising:

a feed mechanism comprising a traction roller which advances a printing medium by gripping the printing medium, wherein the feed mechanism is configured to advance and stop the printing medium;

and the feed mechanism is adjusted in an identical adjustment state for all of plural printing medium types of printing media designed to be used in the printing device so that an average feed error δave is in the vicinity of zero with respect to a first printing medium having the largest value for the average feed error among plural types of printing media designed to be used in the printing device; and a controller configured to supply a feed command to the feed mechanism to control the advance of the printing medium by the feed mechanism;

wherein the controller is configure to set a feed amount correction value to be zero for the first printing medium having the largest value for the average feed error and to set the feed amount correction value to be non-zero for a second printing medium having the smallest value for the average feed error such that the average feed error δave corrected by the feed amount correction value is in the vicinity of zero with respect to both the first and second printing media, and to supply the feed command representing the corrected feed amount to the feed mechanism.

9. A printing device according to claim 8, wherein the specific printing medium includes a most slippery printing medium among the plural types of printing media.

10. A printing device according to claim 8, wherein the specific printing medium includes roll paper.

11. A printing device according to claim 8, wherein the controller is configured to determine the corrected feed value based on feed amount data and feed correction data included in printing data supplied from another device external to the printing device.

12. A printing device according to claim 8, further comprising:

a print head configured to discharge ink to form dots on the printing medium, wherein the print head has N nozzles arranged in a feed direction of the printing medium by a pitch k·D for discharging ink of same color, where k is an integer of 1 or greater, D is a smalles dot pitch in the feed direction, and N is an integer of 2 or greater, and wherein the average feed error δave regarding the most slippery printing medium is an average error when the feeding has been performed by a feed amount of N×(k·D) or smaller.

13. A printing device according to claim 12, wherein the average feed error δave regarding the most slippery printing medium is within a range of about −0.5D to about +0.5D.

14. A printing device according to claim 13, wherein the integer k is 2 or greater, and wherein a value of (k−1) δave obtained by multiplying the average feed error δave regarding the most slippery printing medium by (k−1) is within a range of about −0.5D to about +0.5D.

15. A method of adjusting a feed mechanism of a printing device having a feed mechanism comprising a traction roller which advances a printing medium by gripping the printing medium, wherein the feed mechanism is configured to advance and stop the printing medium, comprising the step of:

adjusting the feed mechanism in an identical state for all of plural printing medium types of printing media designed to be used in the printing device so that an average feed error δave is in the vicinity of zero with respect to a printing medium having the smallest value for the average feed error among plural types of printing media designed to be used in the printing device.

16. A method according to claim 15, wherein the printing device comprises a print head configured to discharge ink to form dots on the printing medium, wherein the print head has N nozzles arranged in a feed direction of the printing medium by a pitch k·D for discharging ink of same color, where k is an integer of 1 or greater, D is a smallest dot pitch in the feed direction, and N is an integer of 2 or greater, and wherein the average feed error δave regarding the most slippery printing medium is an average error when the feeding has been performed by a feed amount of N×(k·D) or smaller.

17. A method according to claim 16, wherein the average feed error δave regarding the most slippery printing medium is within a range of about −0.5D to about +0.5D.

18. A method according to claim 17, wherein the average feed error δave is within a range of about −0.5D to about +0.5D with respect to all of the plural types of the printing media designed to be used in the printing device.

19. A method according to claim 17, wherein the integer k is 2 or greater, and wherein a value of (k−1)·δave obtained by multiplying the average feed error δave regarding the most slippery printing medium by (k−1) is within a range of about −0.5D to about +0.5D.

20. A method according to claim 16, wherein the average feed error δave is of positive value with respect to printing medium other than the most slippery printing medium among the plural types of printing media designed to be used in the printing device.

21. A method according to claim 20, wherein the average feed error δave regarding the most slippery printing media is of negative value.

22. A method of controlling a printing device having a feed mechanism comprising a traction roller which advances a printing medium by gripping the printing medium, wherein the feed mechanism is configured to advance and stop the printing medium, comprising the step of:

adjusting the feed mechanism in an identical adjustment state for all of plural printing medium types of printing media designed to be used in the printing device so that an average feed error δave is in the vicinity of zero with respect to a first printing medium having the largest value for the average feed error among plural types of printing media designed to be used in the printing device;

correcting a feed amount correction value to be zero for the first printing medium having the largest value for the average feed error and to be non-zero for a second printing medium having the smallest value for the average feed error such that the average feed error δave corrected by the feed amount correction value is in the vicinity of zero with respect to both the first and second printing media; and supplying a feed command representing the corrected feed amount to the feed mechanism.

23. A method according to claim 22, wherein the specific printing medium includes a most slippery printing medium among the plural types of printing media.

24. A method according to claim 22, wherein the specific printing medium includes roll paper.

25. A method according to claim 22, wherein the step of correcting a feed amount comprises the step of: determining the corrected feed value based on feed amount data and feed correction data included in printing data supplied from another device external to the printing device.

26. A method according to claim 22, wherein the printing device comprises a print head configured to discharge ink to form dots on the printing medium, wherein the print head has N nozzles arranged in a feed direction of the printing medium by a pitch k·D for discharging ink of same color, where k is an integer of 1 or greater, D is a smallest dot pitch in the feed direction, and N is an integer of 2 or greater, and wherein the average feed error δave regarding the most slippery printing medium is an average error when the feeding has been performed by a feed amount of N×(k·D) or smaller.

27. A method according to claim 26, wherein the average feed error δave regarding the most slippery printing medium is within a range of about −0.5D to about +0.5D.

28. A method according to claim 27, wherein the integer k is 2 or greater, and wherein a value of (k−1)·δave obtained by multiplying the average feed error δave regarding the most slippery printing medium by (k−1) is within a range of about −0.5D to about +0.5D.

* * * * *